United States Patent [19]

Reuter et al.

[11] Patent Number: 4,780,680

[45] Date of Patent: Oct. 25, 1988

[54] PROCESS FOR THE CONTINUOUS, CONTACT-FREE MEASUREMENT OF LAYER THICKNESSES AND APPARATUS FOR PERFORMING THE PROCESS

[75] Inventors: Klaus Reuter, Wiesbaden; Juergen Lingnau, Mainz, both of Fed. Rep. of Germany

[73] Assignee: Hoechst Aktiengesellschaft, Frankfurt am Main, Fed. Rep. of Germany

[21] Appl. No.: 793,781

[22] Filed: Nov. 1, 1985

[30] Foreign Application Priority Data

Nov. 3, 1984 [DE] Fed. Rep. of Germany ....... 3440197

[51] Int. Cl.⁴ .............................................. G01N 27/60
[52] U.S. Cl. .................................... 324/455; 250/325; 324/71.1; 73/159
[58] Field of Search ............... 324/455, 457, 458, 72, 324/71.1; 250/325; 73/159; 361/229, 230

[56] References Cited

U.S. PATENT DOCUMENTS

| | | | |
|---|---|---|---|
| 2,856,582 | 10/1958 | Anderson | 324/61 |
| 3,523,246 | 8/1970 | Hall et al. | 324/61 |
| 3,646,351 | 2/1972 | Jarvis | 250/325 |
| 3,730,753 | 5/1973 | Kerr | 324/455 X |
| 3,935,517 | 1/1976 | O'Brien | 250/325 X |
| 3,998,538 | 12/1976 | Urso et al. | 324/455 X |
| 4,063,155 | 12/1977 | Buchhert | 324/455 |
| 4,298,440 | 11/1981 | Wood | 250/325 X |
| 4,451,732 | 5/1984 | Spongr et al. | 250/308 |
| 4,551,003 | 11/1985 | Ito et al. | 355/14 E X |
| 4,585,323 | 4/1986 | Swing et al. | 250/325 X |
| 4,616,923 | 10/1986 | Reuter | 355/14 E |

FOREIGN PATENT DOCUMENTS

| | | |
|---|---|---|
| 0098509 | 1/1984 | European Pat. Off. . |
| 2362835 | 7/1974 | Fed. Rep. of Germany . |
| 3227025 | 4/1984 | Fed. Rep. of Germany . |
| 2091872 | 8/1982 | United Kingdom . |

OTHER PUBLICATIONS

Adhaesion 1980, Nr, 6m pp. 183–185, Dr. U. Zoll, Stuttgart "Measuring System for the Continuous Determination of Layer Thicknesses".

*Primary Examiner*—Reinhard J. Eisenzopf
*Assistant Examiner*—Robert W. Mueller
*Attorney, Agent, or Firm*—Foley & Lardner, Schwartz, Jeffery, Schwaab, Mack, Blumenthal & Evans

[57] ABSTRACT

Disclosed is a process and apparatus for measuring, in a continuous and contact-free manner, the thickness of a layer applied to a support. The apparatus includes a measuring apparatus which comprises a corona and a first electrostatic voltmeter positioned downstream of the corona in the direction of travel of the layer being measured. The process includes the steps of passing the layer under the apparatus, charging the layer in a contact-free manner, and measuring the level of the charging voltage.

30 Claims, 4 Drawing Sheets

PROCESS FOR THE CONTINUOUS, CONTACT-FREE MEASUREMENT OF LAYER THICKNESSES AND APPARATUS FOR PERFORMING THE PROCESS

BACKGROUND OF THE INVENTION

The present invention relates to a process for the continuous, contact-free measurement of the thickness of a layer applied to a support and to an apparatus for performing the process.

The magazine "Adhaesion" [Adhesion] 1980, number 6, pages 183 to 185, describes systems for the continuous measurement of layer thicknesses, in particular of lacquers and adhesives applied in the liquid state. The measurement principles on which the various methods of thickness measurement are based, which have gained general acceptance in practical use, are compiled, for example, in DIN specifications No. 50,982, part 2, May 1978. Physical effects, which are suitable for a continuous, contact-free measurement of the thickness of material layers, are of optical or electrical nature or are based on the interaction of high-energy radiation, in general radioactive radiation, and material. If an electrical effect is used in apparatuses for the determination of layer thicknesses, the thickness measurement is based on a capacitance measurement. Thereby, the support, to which the layer is applied, must be electrically conductive, i.e., in general a metallic support is used, the support then being connected to the measurement system as one electrode. Together with a second electrode, i.e., the real measuring electrode, the support for the layer forms a plate capacitor system which, relaive to the distance between the two electrodes, has a large surface area. There exists also a contact-free variant of this process according to DIN specification No. 50,985, in which the actual measuring electrode is arranged as closely as possible above the surface of the layer to be measured. Thereby, the distance between the measuring electrode and the surface of the layer to be measured must be selected such that a contact between the layer surface and the measuring electrode is excluded, even if the thickness of the layer to be measured varies.

The capacitance $C_0$ of the measuring capacitor can be determined from the distance "a" between the two electrodes and the surface area "F" of the measuring electrode, by means of the equation $C_0 = \epsilon_0 \cdot F/a$ with the layer to be measured being not yet inserted between the electrodes. The dielectric constant $\epsilon_r$ of the layer to be measured must be determined before by means of a suitable electrical measuring method. The layer thickness is then calculated using the formula $$d = \frac{\epsilon_r}{\epsilon_r - 1} \cdot \left(1 - \frac{C_0}{C}\right) \cdot a$$

when the capacitance C formed by this plate capacitor arrangement is measured continuously, so that in this way the desired permanent thickness control of the layer conveyed on a metal web below the measuring electrode is achieved. Such an arrangement essentially serves to determine a mean layer thickness value, which is averaged over the surface area of the measuring electrode.

U.S. Pat. No. 4,451,732 describes a measuring system comprising a radiation source of radioactive isotopes and a Geiger-Müller Tube as a detection device, for measuring the coating thickness of a continuously moving strip material. The detection device measures, for example, the $\beta$-radiation reflected from the strip material, the intensity of which depends on the layer thickness of the strip material.

In German Offenlegungsschrift No. 32 27 025, there is disclosed a device for determining the weight per unit area or the thickness of a coating applied to a moving strip material, in which a portion of the circumferential surface of a roller dips into the coating agent and transfers some of the coating agent onto the strip material or a distributor roller. Across the width of the strip material, the coating agent container is subdivided into several individual container sections, and the amount of coating agent consumed in each container section is measured separately. The measured values, corresponding to the coating agent consumption measured per time unit, are fed into a computer. The computer controls an automatic control system which adjusts the thickness or the weight per unit area, respectively, of the layer to a constant value by supplying the required quantity of coating agent to each container section, independently of the other container sections.

A disadvantage of the known capacitive measuring method resides in the fact that it largely depends on the distance between the measuring electrode and the surface of the layer to be measured. On the one hand, this distance should be as small as possible, whereas on the other hand it must be great enough to avoid any contact between the layer and the measuring electrode in the case of significant variations in the layer thickness. Employing this measuring method, the thickness of very thin layers is inaccurately determined because the process is not sufficiently sensitive. Furthermore, it is impossible with this method to measure the layer thicknesses of materials which are not purely dielectric, but which additionally possess a certain conductivity in the dark and in the light.

SUMMARY OF THE INVENTION

It is therefore an object of the present invention to provide an apparatus for determining the thickness of materials which is not substantially dependent on the distance between the measuring arrangement and the surface of the layer to be measured.

It is a further object of the present invention to provide an apparatus of the above type which makes possible not only the measurement of the thickness of purely dielectric layers or materials, but also the measurement of the thickness of layers possessing certain conductivity properties.

It is still another object of the present invention to provide a process for the continuous, contact-free measurement of the thickness of a layer applied to a support.

Thus, in accordance with one aspect of the present invention, there is provided a process for the continuous, contact-free measurement of the thickness of a layer applied to a support, comprising the steps of passing a layer under an apparatus, charging the layer in a contact-free manner, and measuring the level of the charging voltage The layer is charged by means of a corona which renders possible uniform charging. For this purpose, a corona with or without a screen, with or without a grid, and with wires or needles can be used. The power supplied may be direct voltage; however, it is also possible to employ alternating voltage superimposed by direct voltage or a pulsed direct voltage. For reasons of reproducibility it is expedient to employ a direct current corona, the charging current of which is kept constant.

In one embodiment of the invention, the layer is moved at uniform speed during charging, and the charge quantity applied to the surface of the layer is kept constant during charging. The layer comprises a dielectric and/or photoconductive material which is applied to a metallic support. Charging can be performed while the layer is still wet with solvent or after the layer has dried.

In a further embodiment of the process, the layer comprises a plastic film moving over an electrically conductive support. If the layer is a photoconductive material, such as the layers of electrophotographic printing plates or organic photoconductor layers, the amount of charge voltage present on the moving layer after a defined exposure is also a measure for the evaluation of its photosensitivity.

The process can also be employed in cases where the layer does not move during charging, but where, instead, the charging field is moved over the stationary layer at constant speed, for example, if the thickness of a varnish layer on a stationary shaped sheet metal part, such as a car roof, is to be measured.

In accordance with another aspect of the present invention there is provided an apparatus for the continuous, contact-free measurement of the thickness of a layer applied to a support, including a measuring apparatus which comprises a corona, and a first electrostatic voltmeter positioned downstream of the corona in the direction of travel of the layer being measured.

The apparatus for performing the process is characterized in that the measuring apparatus is positioned above one of the paths of travel of the layer whose thickness is to be measured. Furthermore, a light source is arranged in the measuring apparatus between the corona and the electrostatic voltmeter. For measuring the level of the charging voltage of the moving layer at two points, the measuring apparatus comprises the corona, the first electrostatic voltmeter and, if appropriate, at a distance of about 3 m to 4 m from the first voltmeter, which distance depends on the conductivity, a light source and a second electrostatic voltmeter.

Other objects, features and advantages of the present invention will become apparent from a review of the detailed description of preferred embodiments which follows, when considered with the attached figures of drawing.

DETAILED DESCRIPTION OF THE PREFERRED EMBODIMENTS

Figure 1:
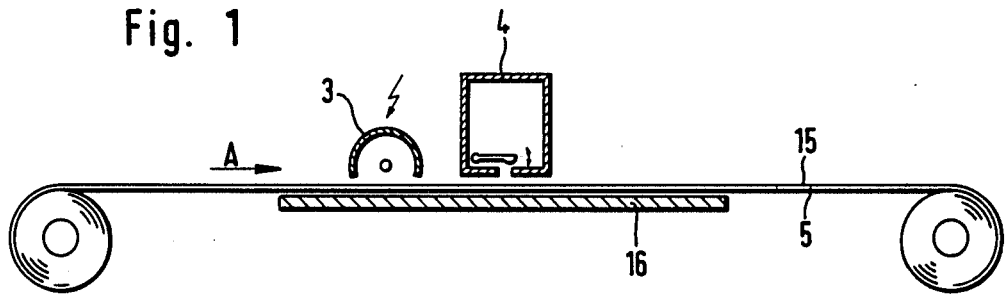
FIG. 1 shows a diagrammatic side view of the measuring apparatus provided above the layer to be measured.

The measuring apparatus for determining the layer thickness according to the present invention is explained by reference to FIGS. 1 and 2. In FIG. 1, a dielectric layer 15, for example, a plastic film, is conveyed, in the direction of transport A, from a supply roll to a wind-up roll. The layer 15 is conveyed along a path of travel 5 which extends over an electrically conductive support 16. The support 16 is electrically connected to earth (not shown in the drawing) and represents the counter-electrode to a corona 3, by which the surface of the layer 15 is charged with a constant charging current. Seen in the direction of transport A, an electrostatic voltmeter 4 is positioned after the corona and acts as a measuring probe for measuring the respective charging voltage of the layer surface. The corona 3 is, for example, operated with a direct current of about 8 kV and comprises either a corona wire or corona needle tips. The distance from the corona wire or the corona needle tips to the layer surface is between about 5 and 20 mm, preferably about 12 mm. The measuring surface of the measuring probe, i.e., the first electrostatic voltmeter 4, is arranged at a distance of about 0.5 to 4 mm from the layer surface. The advance speed of the web is, for example, about 8 m/min, but considerably higher web speeds are possible.

The electrostatic voltmeter 4 for determining the charging voltage of the layer surface is a known device. Along the underside of the voltmeter, which is directed towards the layer to be measured, there is provided a measuring window for a measuring electrode. A vibrating fork in the metal housing of the voltmeter is set into mechanical vibration by an oscillator via a drive, the frequency of which can be tuned, and is electrically connected to the metal housing. The arms of the vibrating fork, which vibrate towards and away from one another, operate as a chopper which periodically opens and closes the measuring window. The electric force lines emanating from the charging voltage or surface potential, respectively, of the layer run through the measuring window to the measuring electrode and are interrupted by the arms, moving to and fro, of the vibrating fork, which move transversely to the lines of force. As a result, a chopped alternating voltage is induced in the measuring electrode, the potential of which is increased until the alternating voltage amplitude reaches a minimum. Thus, the electrical field between the probe and the layer is compensated and the probe potential corresponds to the charging voltage. Further details of electrostatic voltmeters of this type are given, for example, in German Patent Application No. 34 09 701.5.

Instead of the voltmeter, a field meter may also be employed. However, the field meter is more dependent on the distance.

Figure 2:
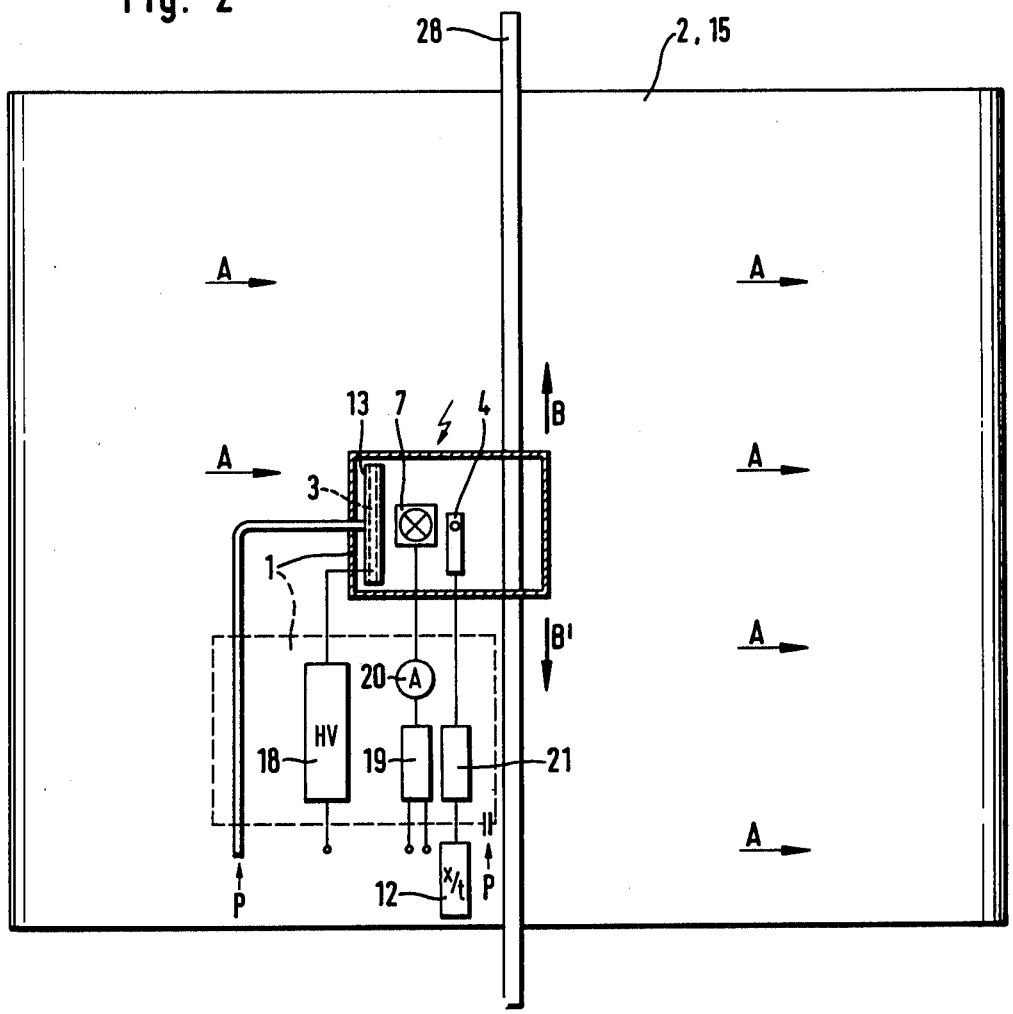
FIG. 2 shows a plan view of the measuring apparatus similar to that shown in FIG. 1, including a light source and supply means for the measuring device.

FIG. 2 shows a diagrammatic plan view of the measuring arrangement illustrated in FIG. 1, including the supply units. The corona 3, the light source 7 and the measuring probe or electrostatic voltmeter 4, respectively, are installed in a common housing which, at its lower end, is open in the direction of a photoconductive and/or dielectric layer 2 applied to a conductive support material 14, or of a layer 15 in the form of a plastic film and a separate electrically conductive support 16. Compressed air or a protective gas is introduced into the interior of a corona screening with slightly excess pressure. The compressed air or protective gas is introduced via a pressure line and a pressure means, for example, a pressure regulator. Examples of suitable protective gases are helium, neon, argon or nitrogen. As a result of the protective gas or compressed air, which suppresses the ignition of explosive gases due to the corona discharge, the measuring apparatus is rendered suitable for use in places where there is a risk of explosion. The protective gas also helps to increase the corona efficiency and thus offers the advantage of a continuous measurement of layer thicknesses even at higher production speeds. Another advantage resides in the prevention of ozone formation.

The corona 3 is provided with a screening 13 of an insulating material and is operated with a direct voltage of about 4 to 12 kV. The voltage level is determined by the desired charging current and can be automatically readjusted by means of a constant current mains supply unit 18.

The light source 7, connected via an ammeter 20 to a power supply unit 19, may be a halogen lamp, a gas-discharge lamp or light-emitting diodes, which emit light in a defined wavelength range and illuminate a given exposure area with a predetermined intensity. Halogen lamps, which can have interference filters and grey filters inserted in their aperture, have proved to be especially suitable. In this way, it is possible to adapt the intensity and wavelength range to the photoconductor used in each case.

Via a voltage supply means 21, the electrostatic voltmeter 4 is connected to an x/t-recorder 12, which, as a function of time or of the transport path, respectively, of the layer 2 or 15, records the charging voltage of the layer surface measured by the voltmeter. It may, of course, also be expedient to use another output unit, such as a voltmeter display, a CRT-tube or an analogue-to-digital converter for computer analysis. The supply units lying within the dashed line in FIG. 2 and the units located in a casing, such as the corona 3, the light source 7 and the voltmeter 4, together form the measuring apparatus 1. The supply units can be connected, in a manner not shown in the drawing, to a compressed air supply means by which a slight overpressure is, for example, produced in the supply units. The supply units can be installed together with the other units of the measuring apparatus 1; however, it is also possible to install them separately, outside the area of the path of transport of the layer 2 or 15. The casing including the corona 3, the light source 7 and the electrostatic voltmeter 4 can be shifted along a guide rail 28 in the direction indicated by arrows B, B', i.e., perpendicularly to the direction of transport A.

Figure 3:
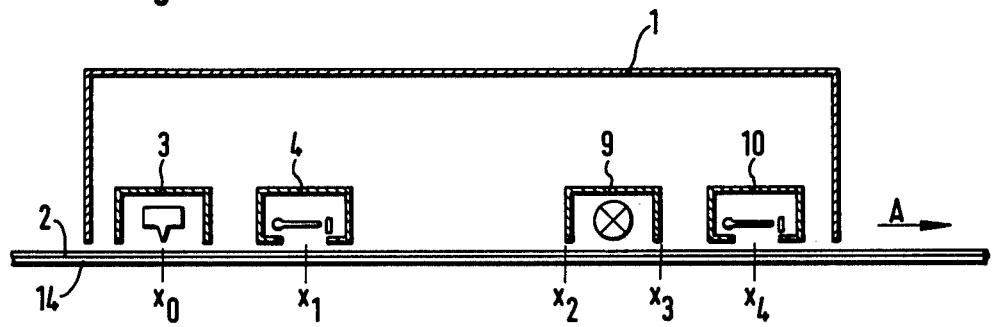
FIG. 3 shows a diagrammatic side view of a measuring apparatus for two measuring points.

The diagrammatic side view of a measuring apparatus for two measuring points according to FIG. 3 shows the corona 3, which is immediately followed by a first electrostatic voltmeter 4. A switchable light source 9, which is immediately followed by a second electrostatic voltmeter 10, is arranged at a distance therefrom which depends on the conductivity in the dark of the layer. These units are arranged in a common casing of the measuring apparatus 1. A measuring apparatus of this type is especially suitable for determining the layer thicknesses of dielectric layers possessing a certain conductivity in the dark. This becomes apparent from the fact that the charging voltage of the layer surface decreases exponentially as a result of a discharge through the layer 2 applied to the metallic support 14.

Figure 4:
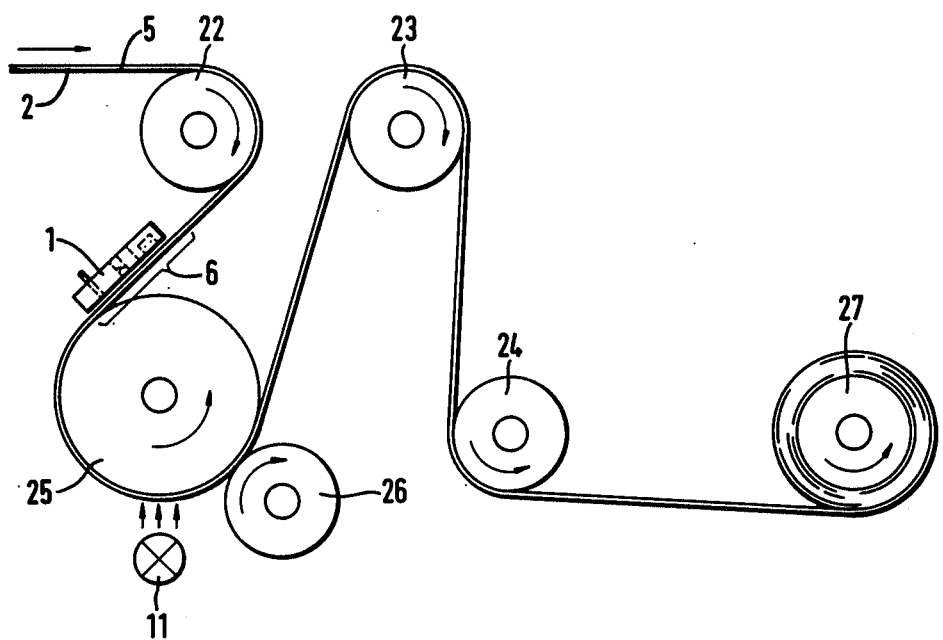
FIG. 4 shows a diagrammatic view of a processing line with a measuring apparatus for photoconductive layers.

FIG. 4 shows a diagrammatic view of a production line for printing plates which are produced from an aluminum support, to which the photoconductive layer is applied. Via a deflection roll 22, a drive roll 25 and further deflection rolls 23, 24, the path of travel 5 extends from a drying channel (not shown) to a wind-up reel 27. In order to ensure easy mounting of the measuring apparatus 1, with the aluminum support vibrating to the least extent possible, the measuring apparatus 1 is fastened above a planar section 6 close to the drive roll 25. A discharge lamp 11 is arranged in the area of the drive roll 25 after the measuring apparatus 1, seen in the direction of transport. By this discharge lamp 11 the electrophotographic layer 2 present on the aluminum support is discharged, for example, by means of an irradiation of about 150 $\mu$J/cm$^2$, at an advance speed of about 8 m/min. In the case of non-photosensitive layers, discharging can be effected by a conductive squeezing roll 26 which adjoins the drive roll 25. It is also possible, though not illustrated, to install the measuring apparatus 1 before the drying channel for the coated aluminum support and to measure the thickness of the still wet, solvent-containing layer. Drying is then performed in a subsequently arranged drying channel.

The physical relationships between the coating thickness and the charging voltage of the layer surface, generated by means of the corona, are explained below with reference to FIGS. 5 to 8.

If the layer charged to a voltage U is considered to represent a capacitor of the capacitance C, the following applies to the charge quantity Q applied to the layer:

$$Q = C \cdot U = I \cdot t, \tag{1}$$

I being the current intensity of the charging current of the corona and t being the time of action of the charging current. Furthermore, there is $$C = \frac{I \cdot t}{U} = \epsilon_0 \frac{\epsilon_r \cdot A}{d}, \tag{2}$$

A being the surface area of the charged layer, d being the thickness of the layer, $\epsilon_r$ being the dielectric constant of the layer material and $\epsilon_0$ being the dielectric constant of the air.

From equations (1) and (2) there follows $$d = U \frac{\epsilon_0 \cdot \epsilon_r \cdot A}{I \cdot t}, \tag{3}$$

and with the layer surface area $$A = x \cdot v \cdot t \tag{4}$$

conveyed below the corona within the time of action t, there follows $$d = U \frac{\epsilon_0 \cdot \epsilon_r \cdot x \cdot v}{I}, \quad (5)$$

x denoting the spark length of the corona and v denoting the speed of the coating relative to the measuring arrangement.

From equation (5), there results the proportionality between the layer thickness d and the charging voltage U of the layer, since the other quantities, such as $\epsilon_0$, $\epsilon_r$, are material constants, x is a predetermined geometrical quantity and v and I are operating quantities which are kept constant.

If the layers have a sufficiently high specific conductivity, the layer weight can be deduced from the level of the saturation charge. In this case, too, there is a direct proportionality between the charging voltage U and the layer thickness d, whereby the resistivity of the layer is contained in the proportionality factor.

Figure 5:
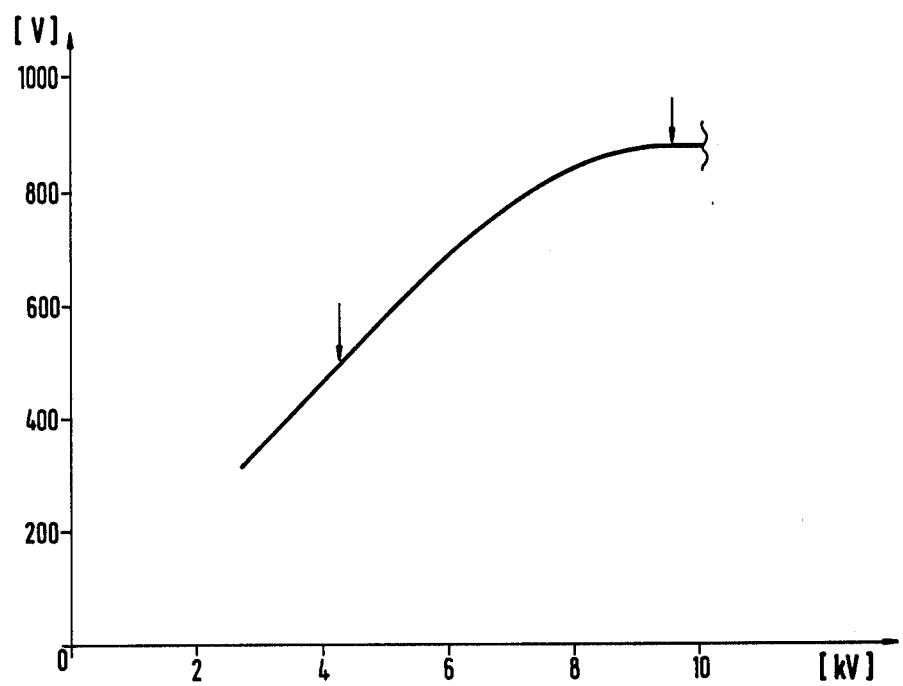
FIG. 5 shows a diagram of the relation between the high voltage of a direct voltage corona and the charging voltage of the layer surface.

FIG. 5 diagrammatically shows the relation between the charging voltage on the layer surface, which is indicated in V, and the high voltage of the corona, which is indicated in kV. In the exemplary measurement, the capacitive range for measuring the charging voltage is obtained when a direct voltage of between 2.3 kV and approximately 8 kV is applied to the corona. It is followed by the ohmic range where the charging voltage remains constant despite a further increase in the corona voltage (saturation range). Breakdown of the layer starts at a voltage of the corona of about 10 kV.

Figure 6:
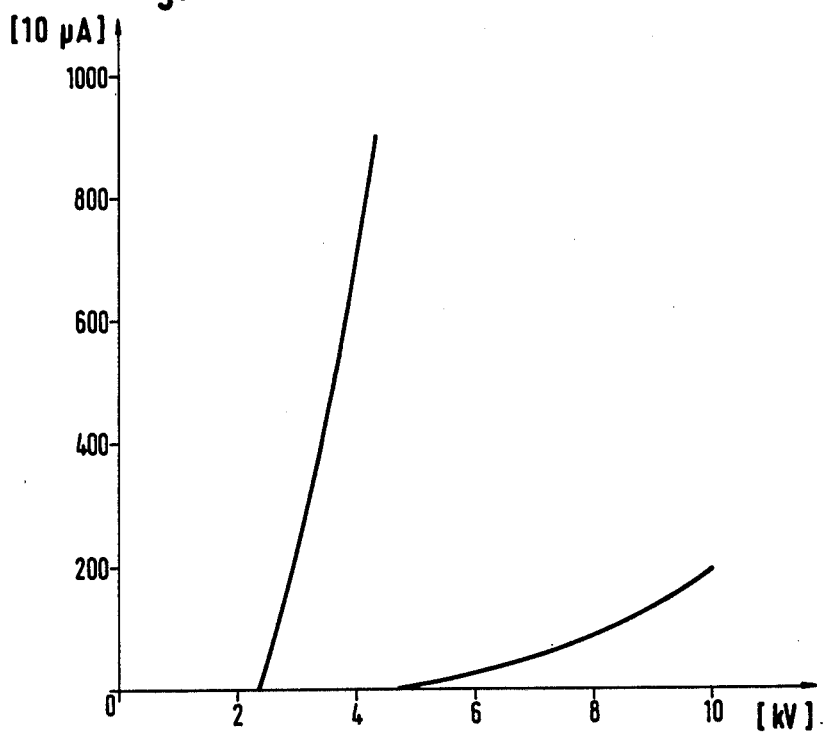
FIG. 6 shows a diagram of the charging current of the corona as a function of the corona voltage, in different atmospheres.

FIG. 6 shows the charging current as a function of the corona voltage. It can be seen that the charging current closely depends on the type of gas present in the area of the corona. In a protective gas atmosphere of nitrogen, the flow of charging current is much higher than in an unflushed corona. In this way, rapid charging of the layer surface and, as a consequence thereof, considerably higher web speeds are rendered possible, without having to change the corona design. A similar effect is observed when other protective gases, such as argon or helium, are used, whereas the charging current is not increased when compressed air or pure oxygen is employed.

Figure 7:
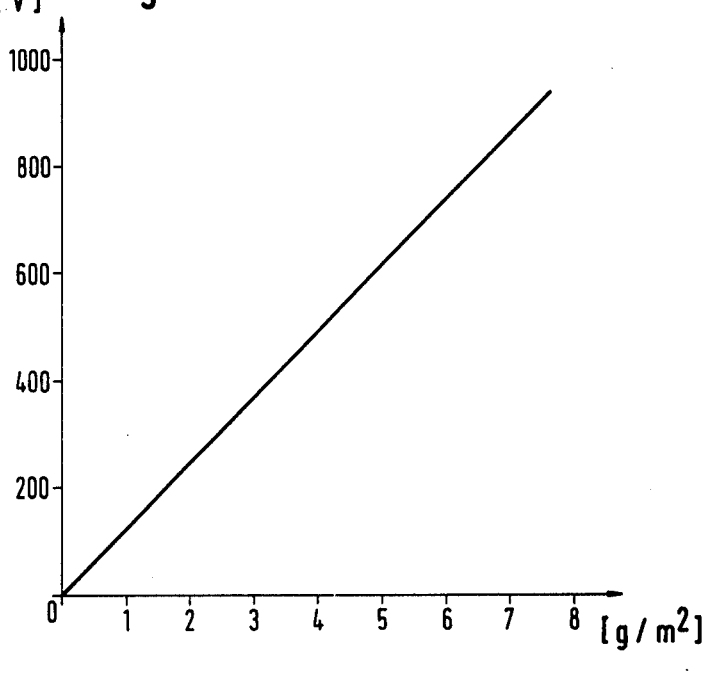
FIG. 7 shows a diagram of the relation between the layer weight and the saturation voltage of the layer surface.

In FIG. 7, the relation between the saturation voltage, in kV, and the layer weight, in g/m, is shown. From good approximation, a linear relation is obtained between the two quantities, a saturation voltage of 120 V corresponding to a layer weight of 1 g/m. It is irrelevant whether the coating is comprised of one or several layers.

Figure 8:
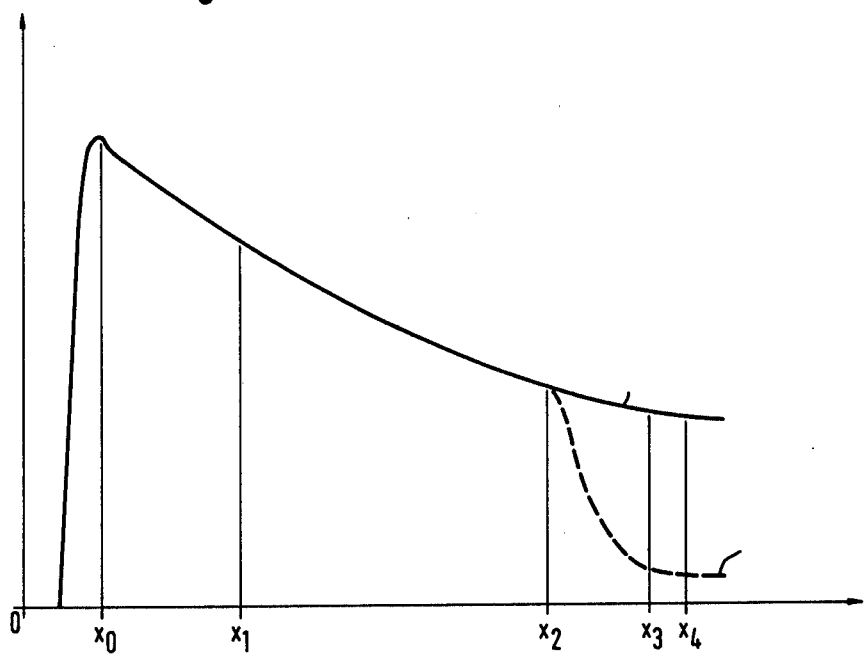
FIG. 8 shows a diagram of the curve of the charging voltage of a photoconductive layer as a function of the path of transport of the layer, with reference to the measuring apparatus of FIG. 3.

FIG. 8 shows the course of the charging voltage relative to the path of transport, along which the layer support 14 carrying the photoconductive layer 2 is conveyed in accordance with the apparatus as shown in FIG. 3. At point $x_o$, the coating 2 is charged by the corona 3, and at point $x_1$ the first measurement is performed by means of the first electrostatic voltmeter 4. A second electrostatic voltmeter 10 is installed at a distance of about 3 to 4 m from the voltmeter 4. The second voltmeter 10 measures the charge level after a defined time period.

As the exponential loss during the discharge of a conductive layer is known, the amount of the saturation voltage can be extrapolated from the charging voltage values measured at the first and at the second measuring point, and in this way the coating weight, and thus also the coating thickness, can be determined in accordance with the linear relationship between the saturation voltage and the layer weight illustrated in FIG. 4.

If a photoconductive layer is used and the light source 9 is switched on, the charging voltage is, as a result of the illumination, reduced between points $x_2$ and $x_3$ by an amount, from which conclusions can be made concerning the photosensitivity of the layer, such as the E/2 value. The E/2 value defines the irradiation in $J/m^2$ or $\mu J/cm^2$ which is necessary to reduce the initial charging voltage of a photoconductor or a photoconductive layer to a value corresponding to half the initial charging voltage. Knowing the irradiation and assuming an exponential voltage loss, the E/2 value of the respective photoconductor layer can be determined by means of the voltage difference between the exposed and unexposed areas of the photoconductor or of a photoconductive layer, respectively.

What is claimed is:

1. An apparatus for continuous, contact free measurement of a thickness of a dielectric layer applied to a grounded support, including a measuring apparatus which comprises:
   a corona which charges a surface of said layer with a constant charging current in order to produce a charging voltage on said layer;
   an electrostatic voltmeter positioned downstream of said corona in a direction of transport of the layer being measured, said electrostatic voltmeter acts as a measuring probe of said charging voltage;
   a light source positioned between said corona and said voltmeter, said light source emits light in a defined wavelength range and illuminates a given exposure area with a predetermined intensity;
   means for receiving the output signal from said electrostatic voltmeter and quantitatively determining the thickness of the layer based on a linear relationship between the thickness of the layer and said charging voltage.

2. An apparatus as claimed in claim 1, further including a pressure unit connected to said measuring apparatus, wherein said pressure unit is slightly overpressurized with compressed air or a protective gas.

3. An apparatus for continuous, contact-free measurement of a thickness of a layer applied to a support, said apparatus comprising: a corona which charges surface of said layer with a constant charging current in order to produce a charging voltage on said surface;
   a first electrostatic voltmeter position downstream of said corona in a direction of transport of the layer being measured, said first electrostatic voltmeter acting as a measuring probe of said charging voltage;
   a light source to reduce the charging level of said surface when said layer is a photoconductive layer; and
   a second electrostatic voltmeter, wherein said light source and said second electrostatic voltmeter are positioned at a distance downstream from said first electrostatic voltmeter in the direction of transport of the layer, said light source being placed before said second electrostatic voltmeter; and
   means for quantitatively determining the thickness of said layer based on an output signal from said first and second electrostatic voltmeters.

4. An apparatus as claimed in claim 3, further comprising a discharge lamp positioned downstream of said measuring apparatus in the direction of transport of the layer.

5. An apparatus as claimed in claim 3, further comprising a conductive roll positioned downstream of said measuring apparatus in the direction of transport of the layer.

6. An apparatus as claimed in claim 3, wherein said measuring apparatus is moveably positionable.

7. An apparatus as claimed in claim 3, wherein said corona comprises a screen which includes a dielectric material.

8. An apparatus as claimed in claim 3, wherein said corona comprises a corona wire.

9. An apparatus as claimed in claim 3, wherein said corona comprises corona needle tips.

10. An apparatus as claimed in claim 3, wherein said corona is positioned at a distance of about 5 to 20 mm from the layer.

11. An apparatus as claimed in claim 3, wherein the measuring surface of said electrostatic voltmeter is positioned at a distance of about 0.5 to 4 mm from the layer.

12. An apparatus as claimed in claim 3, wherein the measuring surface of said first and second electrostatic voltmeters are positioned at a distance of about 0.5 to 4 mm from the layer.

13. An apparatus for continuous, contact free measurement of a thickness of a layer applied to a support, including a plurality of measuring apparatuses arranged in parallel, each of said measuring apparatuses comprising:
   a corona which charges a surface of said layer with a constant charging current in order to produce a charging voltage on said layer;
   an electrostatic voltmeter positioned downstream of said corona in a direction of transport of the layer being measured, said electrostatic voltmeter acting as a measuring probe of said charging voltage;
   a light source positioned between said corona and said voltmeter, said light source emitting light in a defined wavelength range and illuminating given exposure area with a predetermined intensity; and
   means for quantitatively determining the thickness of said layer based on an output signal from said electrostatic voltmeter.

14. A process for continuous, contact-free measurement of a thickness of a layer applied to a support, comprising the steps of:
   passing a layer under an apparatus;
   charging a surface of said layer in a contact-free manner to produce a charging voltage;
   measuring said charging voltage level; and
   determining the thickness of said layer based on a linear relationship between the thickness of the layer and said charging voltage.

15. A process for continuous, contact free measurement of a thickness of a layer applied to a support, comprising the steps of:
   passing a layer underneath a measurement apparatus;
   charging a surface of said layer in a contact free manner to produce a charging voltage with a corona;
   measuring said charging voltage level said measuring step comprises measuring the charging voltage of said layer at two points located at a distance from one another in a direction of transport of said layer with electrostatic voltmeters; and
   determining the thickness of said layer based on said charging voltage level.

16. A process as claimed in claim 15, wherein a charge quantity, which is generated by an alternating current field, is applied to said layer during said charging step.

17. A process as claimed in claim 15, wherein a charge quantity, which is generated by a direct current field, is applied to said layer during said charging step.

18. A process as claimed in claim 15, wherein a charge quantity, which is generated by a pulsed current field, is applied to said layer during said charging step.

19. A process as claimed in claim 15, wherein a charge quantity, which is generated by an alternating current field, with a super-imposed pulsed direct current field, is applied to said layer during said charging step.

20. A process as claimed in claim 15, wherein said charging step is performed in a protective gas atmosphere.

21. A process as claimed in claim 15, wherein said passing step is performed at a constant speed during said charging step, and wherein a charge quantity applied to the surface of said layer is constant during charging.

22. A process as claimed in claim 15, wherein said layer comprises a dielectric material and is applied to a metallic support.

23. A process as claimed in claim 15, wherein said layer comprises a photoconductive material and is applied to a metallic support.

24. A process as claimed in claim 15, wherein said charging step comprises charging said layer while said layer is wet with solvent.

25. A process as claimed in claim 15, wherein said charging step comprises charging said layer when said layer is dry.

26. A process as claimed in claim 14, wherein said layer comprises a plastic film, said film being conveyed along an electrically conductive support.

27. A process for continuous, contact free measurement of a thickness of a layer applied to a support, comprising steps of:
   passing a layer under a measuring apparatus;
   charging a surface of said layer with a charging field from a corona in a contact free manner to produce a charging voltage, in a proportional range of a curve representative of a relationship between said charging voltage of said layer and said charging field;
   measuring said charging voltage level with an electrostatic voltmeter; and
   determining the thickness of said layer based on said charging voltage level.

28. A process as claimed in claim 27, wherein said charging step comprises retaining said layer in a stationary position and moving a charge field over said stationary layer at a constant speed.

29. A process as claimed in claim 27, wherein said layer is charged to a saturation point during said charging step.

30. A process as claimed in claim 27, comprising the further step of exposing said layer subsequent to said charging step, and measuring the charging voltage following said exposure step.

* * * * *